United States Patent [19]

Golestaneh

[11] 4,325,217

[45] Apr. 20, 1982

[54] SOLID STATE ENGINE WITH ALTERNATING MOTION

[75] Inventor: Ahmad A. Golestaneh, Bolingbrook, Ill.

[73] Assignee: The United States of America as represented by the United States Department of Energy, Washington, D.C.

[21] Appl. No.: 113,868

[22] Filed: Jan. 21, 1980

[51] Int. Cl.³ ............................................... F03G 7/06
[52] U.S. Cl. ..................................................... 60/527
[58] Field of Search ................................... 60/527–529

[56] References Cited

U.S. PATENT DOCUMENTS

| | | | |
|---|---|---|---|
| 3,665,705 | 5/1972 | Christensen | 60/527 |
| 3,830,060 | 8/1974 | Jedlicka et al. | 60/527 |
| 3,913,326 | 10/1975 | Banks | 60/527 |
| 3,937,019 | 2/1976 | Renner | 60/527 |
| 4,027,479 | 6/1977 | Cory | 60/527 |
| 4,041,706 | 8/1977 | White | 60/527 |
| 4,086,769 | 5/1978 | Smith | 60/527 |
| 4,087,971 | 5/1978 | Hart | 60/527 |

OTHER PUBLICATIONS

Golestanch, "Efficiency of the Solid-State Engine Made with Nitinol Memory Material", *Journal Applied Physics* 49(3), Mar. 1978.

Wang and Buehler, "Additional Unique Property Changes Observed During TiNi Transition," Applied Physics Letter, vol. 21, No. 3, Aug. 1972.

Acta Mettallurgica, vol. 25, pp. 1315–1321.

*Primary Examiner*—Allen M. Ostrager
*Attorney, Agent, or Firm*—Richard G. Besha; Hugh W. Glenn; Robert J. Fisher

[57] ABSTRACT

Heat energy is converted to mechanical motion utilizing apparatus including a cylinder, a piston having openings therein reciprocable in the cylinder, inlet and outlet ports for warm water at one end of the cylinder, inlet and outlet ports for cool water at the other end of the cylinder, gates movable with the piston and slidably engaging the cylinder wall to alternately open and close the warm and cool water ports, a spring bearing against the warm water side of the piston and a double helix of a thermal shape memory material attached to the cool end of the cylinder and to the piston. The piston is caused to reciprocate by alternately admitting cool water and warm water to the cylinder.

3 Claims, 3 Drawing Figures

SOLID STATE ENGINE WITH ALTERNATING MOTION

CONTRACTURAL ORIGIN OF THE INVENTION

The invention described herein was made in the course of, or under, a contract with the UNITED STATES DEPARTMENT OF ENERGY.

CROSS REFERENCE TO RELATED APPLICATIONS

This application is closely related to applicant's copending application Ser. No. 114,134 filed cocurrently herewith.

BACKGROUND OF THE INVENTION

This invention relates to a device for converting heat energy to mechanical energy.

In more detail the invention relates to a device that utilizes a shape memory material to convert low temperature thermal energy to mechanical energy.

Sources of low-grade heat frequently exist at the site at which a demand exists for low-grade energy. For example, homes, farms, factories, office buildings, hotels, and the like frequently have a constant supply of hot water available, not all of which is utilized for its intended purpose. In addition, the waste heat of industrial, farm or home equipment may be economically utilized to heat water to a low temperature. Furthermore, it can confidently be predicted that low-grade heat in the form of hot water will in the near future be economically available almost everywhere from solar power. In general, this water is not hot enough to drive a turbine or use in any conventional type of energy-generating equipment.

Frequently, the energy demand may be for relatively low-power energy, either constant or constantly available even if not required constantly. Among the small-scale — and yet important — applications envisioned for heat engines working at low temperatures across a small $\Delta T$ to produce a limited but significant amount of power are devices designed to orient solar apparatus, to regulate thermal heat control and as a thermal safety valve. Despite the limitations imposed on low-temperature heat engines, sources of low-grade heat are so wide spaced and available that utilization of a small fraction thereof could have a significant impact on the world energy supply.

Low temperature energy conversion utilizing heat engines based on the energetic shape recovery of a deformed thermoelastic material—called a shape memory material—have been extensively investigated. These "memory materials" are capable of undergoing a martensitic (diffusionless) transition with the ability of the alloys to undergo such a transition being temperature dependent. The temperature range at which this transition can occur is hereinafter called the critical temperature and is characteristic of the particular alloy under consideration. At temperatures below their critical temperatures, these alloys are highly ductile and may be plastically deformed. Annealed at a temperature above its critical temperature in a given shape (hereinafter designated the "heat-treated configuration") and deformed into a "deformed configuration" at a temperature below that critical temperature, such an alloy will revert back to its heat-treated configuration when heated to or above its critical temperature. The alloy will move in a direction opposite to the direction in which it had been deformed and in so doing will exert considerable mechanical force and can produce useful work.

These memory materials have been produced in shapes of wires, rods, foils, plates, tubes, springs, etc., and with wide ranges of temperature responsiveness which is a function of alloy composition and production history. For example, memory materials are available that possess critical temperatures in the range of from $-150°$ C. to $+150°$ C. The alloys of one such series, referred to as 55-Nitinol, have chemical compositions in the range from about 53 to about 57 weight percent nickel balance titanium, and are based on the intermetallic compound NiTi. Descriptions of these and other titanium-based memory materials are given in U.S. Pat. Nos. 3,174,851 (W. J. Buehler et al, "Nickel-Base Alloys," Mar. 23, 1965); 3,403,238 (W. J. Buehler et al, "Conversion of Heat Energy to Mechanical Energy," Sept. 24, 1968); and 3,558,369 (F. E. Wang et al, "Method of Treating Variable Transition Temperature Alloys," Jan. 26, 1971).

These alloys have found practical application in a number of different areas such as control devices and medical instruments. A wide variety of heat engines employing the alloys have also been proposed. A partial list of patents directed to such devices follows:

| | |
|---|---|
| U.S. Pat. No. 3,913,326 | Oct. 21, 1975 |
| U.S. Pat. No. 4,027,479 | May 6, 1976 |
| U.S. Pat. No. 4,086,769 | May 2, 1978 |
| U.S. Pat. No. 4,087,971 | May 9, 1978 |

The following publications also describe such devices.

Science Magazine, Vol. 191, Mar. 5, 1976 p.934–6

Intersociety Energy Conversion Conference 1975 record p.530–4

Scientific American, Apr. 1971, p. 118–122

Particularly pertinent to the present invention is U.S. Pat. No. 4,086,769. This patent relates to a compound memory engine incorporating a plurality of chambers each containing a work element of Nitinol in the shape of a coil spring. All of the Nitinol elements have been heat-treated in a contracted state to establish a memory position for the coil. One end of the Nitinol coils is attached to the back wall of a chamber and the other end to a plunger rod which in turn is connected to a crank shaft. When hot water is introduced into the chambers, the Nitinol coils return to their contracted memory position which provides the driving force to turn the crank shaft and stretch the other Nitinol elements in the system.

Although these and numerous other approaches have been proposed and utilized to provide thermally driven motive power sources, most prior art devices have been so mechanically complicated or grossly inefficient as to be impractical.

It is accordingly the object of the invention to provide a thermal engine which is mechanically simple and operationally feasible for certain applications.

SUMMARY OF THE INVENTION

In carrying out the present invention a thermal shape memory material is used to convert heat energy to mechanical motion. An apparatus embodying the present invention comprises a cylinder, a piston having openings therein reciprocable in the cylinder, inlet and outlet ports for warm water at one end of the cylinder, inlet and outlet ports for cool water at the other end of the cylinder, gates movable with the piston and slidably engaging the cylinder wall to alternately open and close the warm and cool water ports, a spring bearing against the warm water side of the piston and a double helix of a thermal shape memory material attached to the cool end of the cylinder and to the piston. The piston is caused to reciprocate by alternately admitting cool water and warm water to the cylinder. Cool water cools the memory material below its initial temperature causing the thermally responsive material to contract. The spring drives the piston in a direction that closes the cool water inlet and opens the warm water inlet. The warm water heats the thermally responsive material above its critical temperature causing it to extend to its original elongated state forcing the piston to its original position and reopening the cool water inlet.

According to an alternative embodiment, a double acting engine contains two cylinders having pistons therein on a single piston rod and a pumping or similar action of a working axle is obtained.

DESCRIPTION OF THE PREFERRED EMBODIMENT

Figure 1:
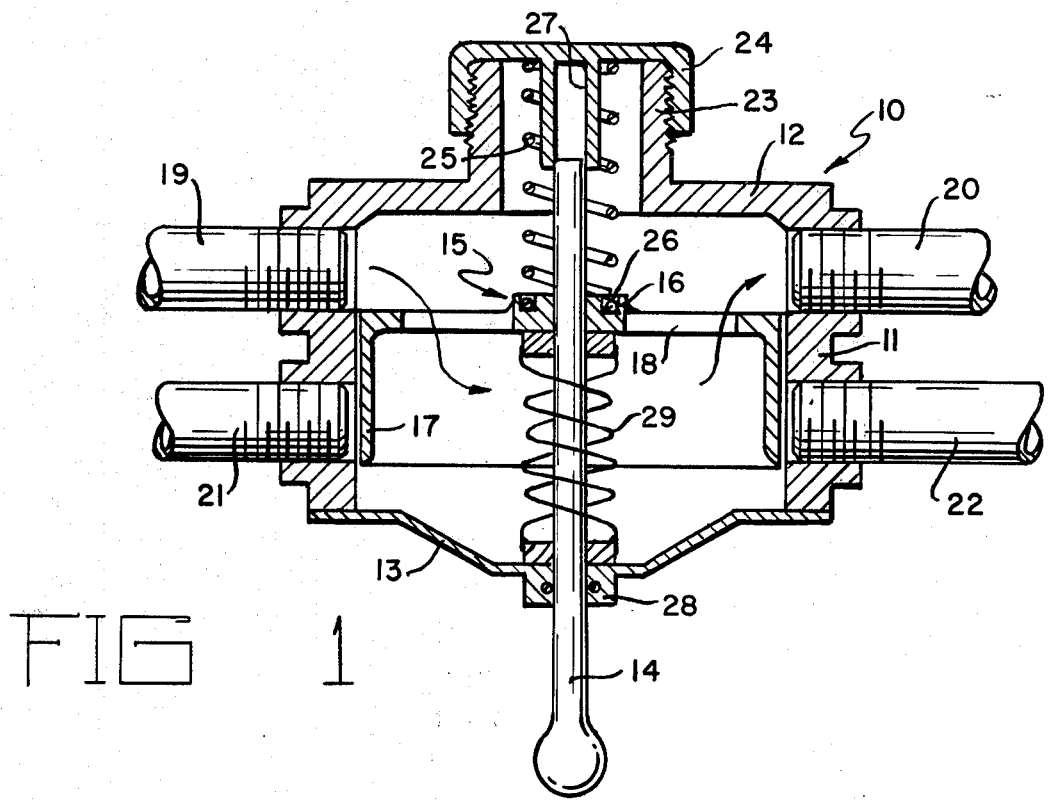
FIG. 1 is a vertical section of a reciprocating engine according to the present invention showing the piston rod thereof in one position of its stroke.
Figure 2:
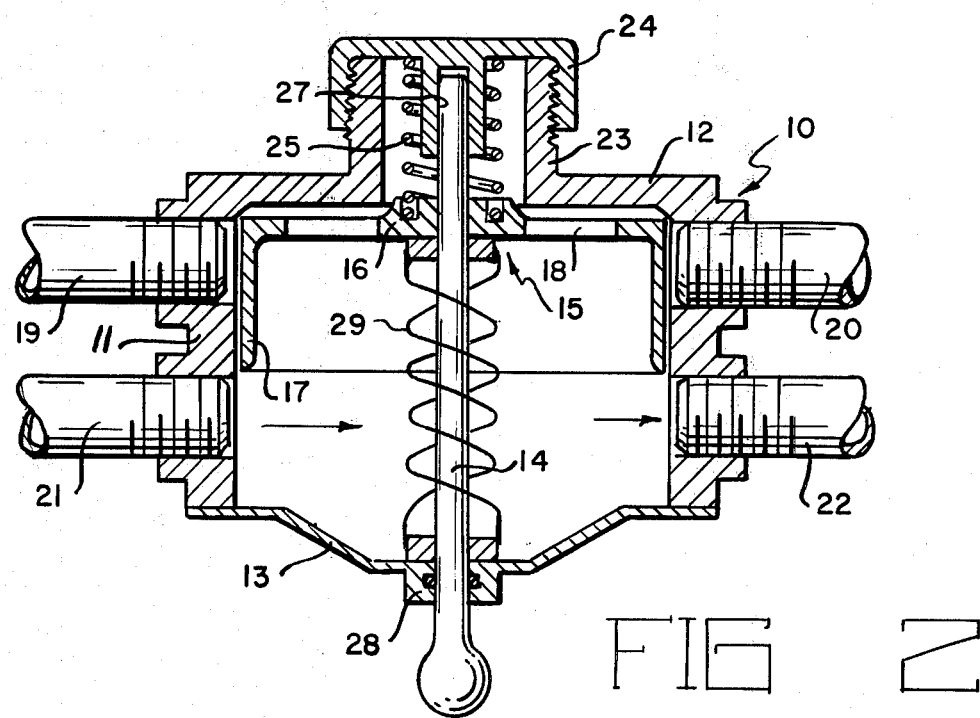
FIG. 2 is a vertical section thereof showing the piston rod in the other position of its stroke and FIG. 3 is a vertical section of an alternate embodiment.

As shown in FIGS. 1 and 2 the reciprocating engine of the present invention comprises a cylinder 10 consisting of a side wall 11, an end wall 12 integral therewith extending across one end of the cylinder and a cover 13 for the other end of the cylinder. Axially disposed in housing 10 is a piston rod 14 to which is fastened piston 15 consisting of a hub 16 which carries gates 17 by means of a spider 18. Gates 17 are disposed in sliding engagement with cylindrical wall 11 to cover hot water inlet and outlet lines 19 and 20 respectively and alternately therewith cover cold water inlet and outlet lines 21 and 22. The inlet and outlet lines are on opposite sides of the housing and the cool water lines are at one end of the housing, the warm water lines being at the other.

An axial cylindrical extension 23 of housing 10—provided with a threaded cap 24—serves as a well to receive one end of a spring 25, the other end of which is received in a groove 26 in hub 16 of piston 15. A socket 27 axially disposed on the inner face of cup 24 receives one end of piston rod 14 and serves as a guide for spring 25. The opposite end of piston rod 14 penetrates cover 13 where it can peform useful work, the opening therein being sealed by an O-ring 28.

Finally, but most importantly, a double helix 29 of a thermal memory material surrounds piston rod 14 and is secured to cover 13 and piston 16. As thermal memory material Nitinol—an alloy containing 53-57% nickel, the remainder being titanium—may be used. The memory material is heat-treated at above the critical temperature in its extended position so that it will return to this when heated above the critical temperature.

The heat engine cycle is as follows: When the piston is at the top of its stroke (as shown in FIG. 2) the hot water inlet and outlet ports are blocked. Cold water flows into the cylinder through the cold-water port, cooling the memory material to below its critical temperature, causing the thermally responsive material to relax from its memory state so that spring 25 can force the piston 15 down. As the piston reaches the bottom of its stroke the cold-water inlet and outlet ports are blocked and the hot water inlet and outlet ports are open, allowing hot water to enter the cylinder, flow through the holes in the top of the piston and flush out the cold water. The thermally responsive material is heated to above its critical temperature, causing it to extend to its original elongated memory state, forcing the piston up to its top position. The cycle then repeats continuously.

Figure 3:
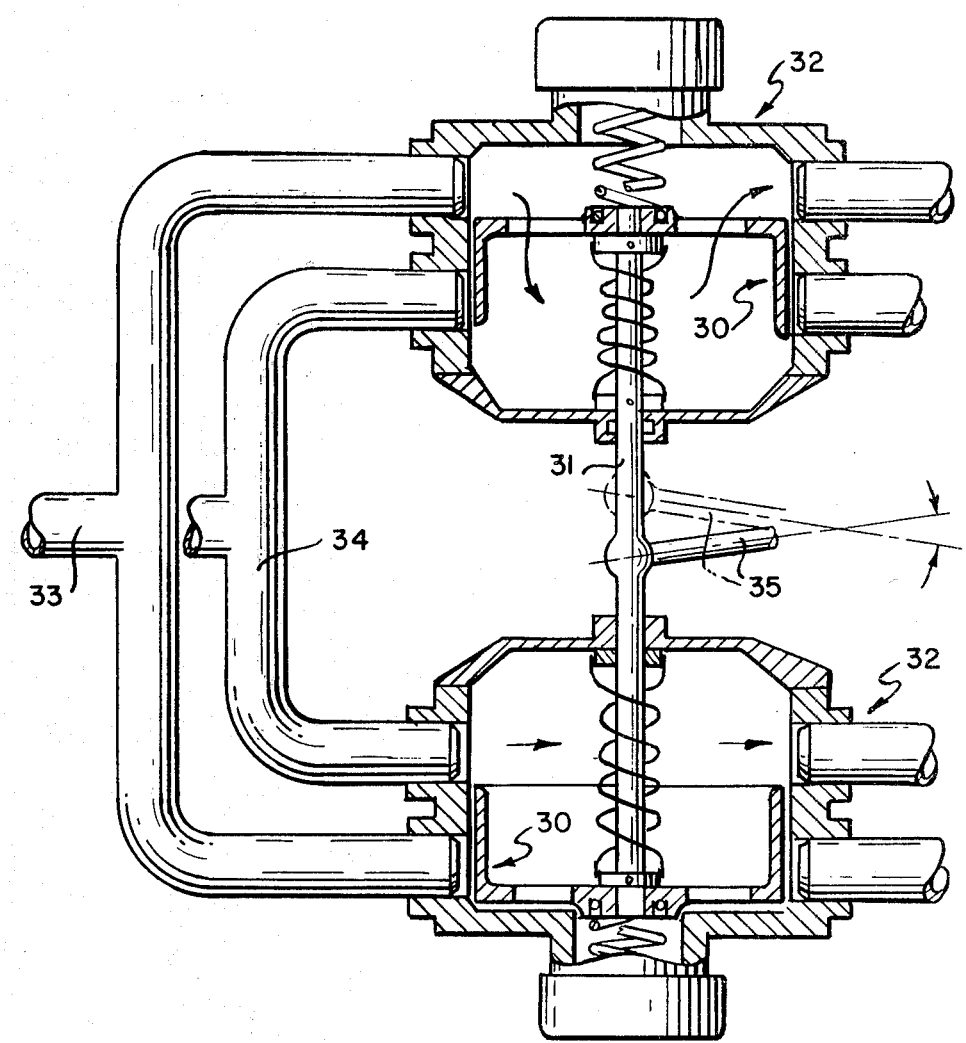

The modification shown in FIG. 3 employs a doubleacting piston assembly including identical pistons 30 mounted at opposite ends of a connecting rod 31. Pistons 30 reciprocate in identical separate cylinders 32. Pistons 30 and cylinders 32 are functionally identical and structurally very similar to similar elements shown in FIGS. 1 and 2 and accordingly will not be further described. Each cylinder 32 is provided with hot water inlet and outlet ports at the distal ends thereof and with cold water inlet and outlet ports at the proximate ends thereof. Both hot water inlet ports are supplied with hot water by a pipe 33 and both cold water inlet ports are supplied with cold water by a pipe 34. Hot water is admitted to one cylinder at the same time cold water is admitted to the other so that return of the Nitinol elements in one cylinder to the memory position will stretch the Nitinol elements in the other cylinder. Power takeoff is by a rocker arm 35 connected to the midpoint of connecting rod 31.

The embodiments of the invention in which an exclusive property or privilege is claimed are defines as follows:

1. A device for converting heat energy to reciprocating mechanical energy comprising:
   a cylinder having inlet and outlet ports for hot water at one end of the cylinder to establish a warm end thereof and inlet and outlet ports for cold water at the other end of the cylinder to establish a cool end thereof opposite to the warm end,
   a piston reciprocally contained within said cylinder having a warm side and a cool side corresponding respectively to the warm end and the cool end of said cylinder, said piston having openings therein for passage for water longitudinally therethrough,
   means movable with said piston for alternately opening and closing said hot water and cold water ports,
   a spring disposed within the cylinder bearing on the warm side of the piston, and
   a double helix of a thermal memory material attached to the cool end of the cylinder and the cool side of the piston.

2. A device for converting heat energy to reciprocating mechanical motion of a piston rod comprising:
   a cylinder having inlet and outlet ports for hot water at one end of the cylinder to establish a warm end thereof and inlet and outlet ports for cold water at the opposite end of the cylinder to establish a cool end thereof opposite to the warm end, said inlet and outlet ports being on opposite sides of the cylinder,
   a piston rod axially disposed in said cylinder and having a piston fastened thereto, said piston having a warm side and a cool side corresponding respectively to the warm end and the cool end of said cylinder, said piston having openings extending therethough for passage of fluid between the warm and cool ends of the cylinder, gates, integrally connected and fastened to the piston on the cool side thereof to move therewith and disposed in sliding engagement with the wall of the cylinder to alternately open and close the inlet and outlet ports, a spring surrounding the piston extending into a well in the warm end of the cylinder and bearing thereon and into a groove in the hub of the piston and bearing thereon, and a double helix of a thermal memory material attached to the cool end of the cylinder and to the cool side of the piston.

3. A device according to claims 1 or 2 wherein two cylinders are connected in tandem by a single piston rod having a piston on each end thereof in both cylinders, the power takeoff being intermediate the two cylinders.

* * * * *